United States Patent [19]

Taylor

[11] Patent Number: 4,564,048

[45] Date of Patent: Jan. 14, 1986

[54] PRESSURE ACCUMULATOR WITH COMPOSITE HELICAL SPRING

[75] Inventor: Paul H. Taylor, Grand Island, N.Y.

[73] Assignee: Tayco Developments, Inc., North Tonawanda, N.Y.

[21] Appl. No.: 614,334

[22] Filed: May 25, 1984

[51] Int. Cl.4 .............................................. F16L 55/04

[52] U.S. Cl. ........................................ 138/31; 138/26

[58] Field of Search ............... 138/26, 31; 188/322.17, 188/322.19; 267/136, 140.1; 92/134, 165 R

[56] References Cited

U.S. PATENT DOCUMENTS 710,889 10/1902 Prescott et al. ....................... 138/31
4,174,656 11/1979 Duffey ............................. 138/31 X

FOREIGN PATENT DOCUMENTS 223965 1/1959 Australia .............................. 138/31

*Primary Examiner*—James E. Bryant, III
*Attorney, Agent, or Firm*—Joseph P. Gastel

[57] ABSTRACT

A pressure accumulator including a plastic cylinder having first and second cylinder ends, a piston in the cylinder, a bore in the first cylinder end, a piston rod attached to the piston and extending through the bore, a cylinder cap at the second end, a fluid inlet at the second cylinder end for conducting fluid into the cylinder, an external portion on the piston rod located outside of the cylinder, and a composite helical spring encircling the cylinder and having a first end attached proximate the cap and a second end attached to the external portion of the piston rod.

27 Claims, 5 Drawing Figures

PRESSURE ACCUMULATOR WITH COMPOSITE HELICAL SPRING

BACKGROUND OF THE INVENTION

The present invention relates to an improved pressure accumulator construction and more particularly to a pressure accumulator utilizing a helical spring which encircles the cylinder of the accumulator.

By way of background, pressure accumulators utilizing mechanical springs have fallen out of favor because their energy storage capacity is a fraction of the energy storage capacity of pressure accumulators which are of the gas or liquid spring type. The reason they have fallen out of favor is two-fold. First of all, in those designs wherein the mechanical spring was incorporated within a cylinder, the space occupied by the spring limited the capacity of the accumulator. Furthermore, the metal springs did not have the desired energy storage capacity because they could not provide long travel at a high spring force. It is with overcoming the foregoing deficiencies of prior spring accumulators that the present invention is concerned.

SUMMARY OF THE INVENTION

It is accordingly one important object of the present invention to provide an improved spring type of pressure accumulator which has a very high energy storage capacity.

Another object of the present invention is to provide an improved mechanical spring type of pressure accumulator having a construction utilizing a relatively large diameter coil spring mounted externally on the pressure cylinder which contains a piston of much smaller diameter than the spring, to thereby possess a relatively high pressure capability.

Still another object of the present invention is to provide a highly versatile mechanical spring type of pressure accumulator construction which can utilize a basic cylinder with different types and sizes of springs to thereby provide advantages from production and inventory aspects.

A further object of the present invention is to provide an unique mechanical spring type of pressure accumulator wherein the mechanical spring aids in maintaining the cap of the accumulator in assembled condition on its associated cylinder. Other objects and attendant advantages of the present invention will readily be perceived hereafter.

The present invention relates to a pressure accumulator comprising a cylinder having first and second cylinder ends, a piston in said cylinder, a bore in said first cylinder end, a piston rod attached to said piston and extending through said bore, a fluid inlet at said second cylinder end for conducting fluid into said cylinder, an external portion on said piston rod located outside of said cylinder, a helical spring encircling said cylinder, first and second spring ends on said helical spring, first attachment means fixedly coupling said first spring end to said external portion of said piston rod, and second attachment means coupling said second spring end to said cylinder remote from said first end.

The present invention also relates to a pressure accumulator comprising a cylinder having first and second cylinder ends, a piston in said cylinder, a bore in said first cylinder end, a piston rod attached to said piston and extending through said bore, a fluid inlet at said second cylinder end, an external portion on said piston rod located outside of said cylinder, a composite spring having first and second spring ends, first attachment means attaching said first spring end relative to said cylinder, and second attachment means attaching said second spring end to said external portion of said piston rod, said composite spring having a lower modulus of elasticity than metal and a higher strength than plastic.

The various aspects of the present invention will be more fully understood when the following portions of the specification are read in conjunction with the accompanying drawings wherein:

DESCRIPTION OF THE PREFERRED EMBODIMENTS

Figure 1:
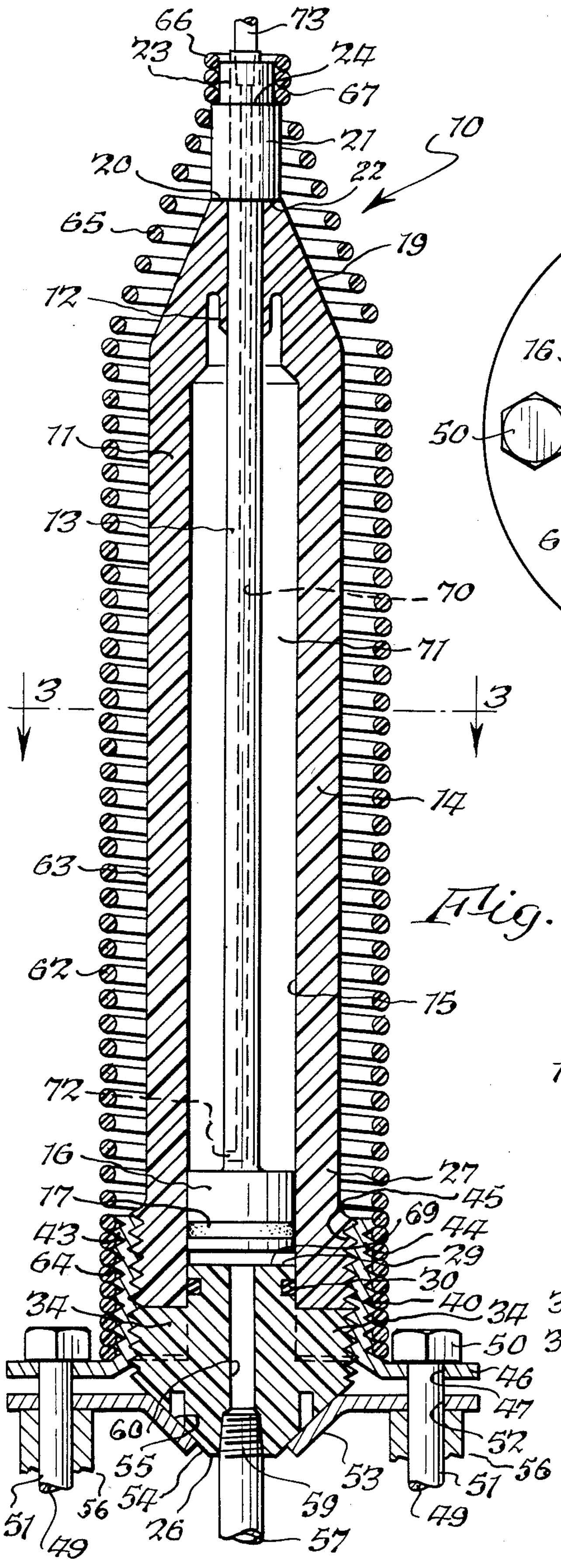
FIG. 1 is a fragmentary cross sectional view of the improved pressure accumulator of the present invention taken substantially along line 1—1 of FIG. 3.
Figure 3:
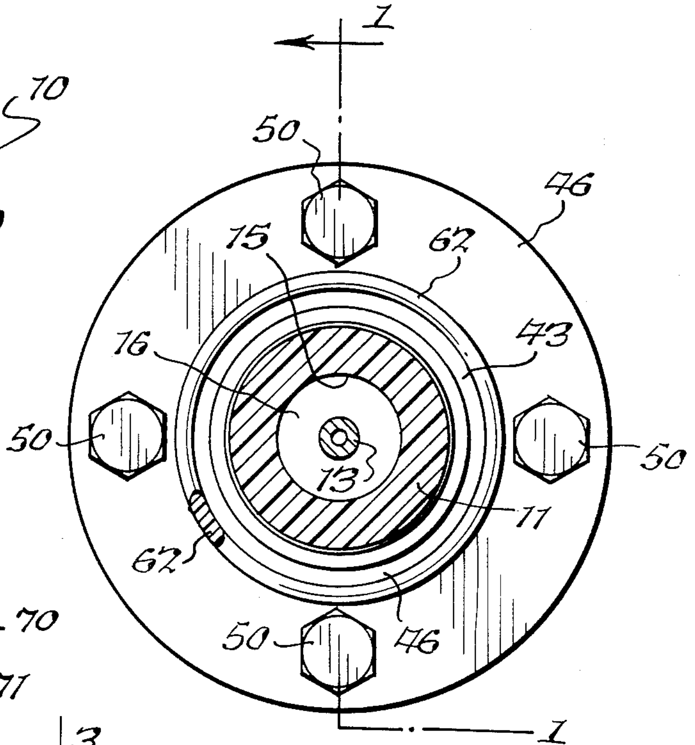
FIG. 3 is a fragmentary cross sectional view taken substantially along line 3—3 of FIG. 1.

The improved pressure accumulator 10 comprises a cylinder 11 which is preferably fabricated from molded plastic which may be nylon or Delrin and which has an integral annular seal 12 for receiving piston rod 13. Seal 12 is the type disclosed in U.S. Pat. No. 4,265,344, which is incorporated herein by reference. Cylinder 11 includes a central portion 14 of substantially cylindrical configuration which defines cylindrical bore 15 in which piston head 16 rides, piston head 16 being mounted at the end of piston rod 13. An O-ring 17 is mounted on piston head 16 to provide a fluid tight seal with the cylinder wall.

The central portion 14 of cylinder 11 merges into frustoconical portion 19 which terminates at shoulder 20. A collar 21 is fixedly secured to the portion of piston rod 13 which is outside of cylinder 11. Collar 21 has a shoulder 22 which abuts shoulder 20 when accumulator 10 is unpressurized. A reduced cylindrical portion 23 forms a part of cylindrical collar 21 and also encircles piston rod 13. A shoulder 24 is located at the junction of the reduced portion 23 and the remainder of collar 21.

Figure 2:
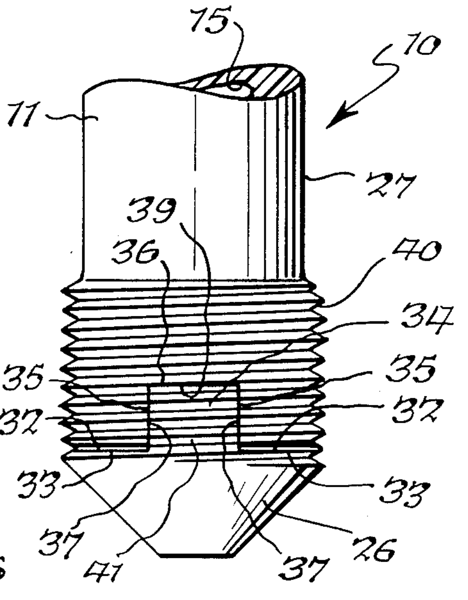
FIG. 2 is a fragmentary side elevational view showing the key connection between the cylinder cap and the end of the cylinder.

A cap 26 is located at the end 27 of cylinder 11. Cap 26 includes a central cylindrical plug portion 29 having an O-ring 30 mounted thereon. Plug portion 29 fits into cylindrical bore 15 at cylinder end 27. Arcuate shoulders 32 of cap 26 abut arcuate shoulders 33 at the end of cylinder portion 27 (FIG. 2). In addition, diametrically opposed keys 34 are formed integrally with cap 26. Keys 34 each have side walls 35 and an end wall 36. The arcuate shoulders 32 extend between keys 34. Side walls 35 abut side walls 37 in cylinder end portion 27 and end wall 36 abuts wall 39. Thus, there is a nonrotational fit between cap 26 and cylinder end portion 27. A large size helical thread 40 is formed on cylinder end portion 27. Matching helical thread portions 41 are formed on keys 34 (FIG. 2).

A bracket 43 is mounted on threads 40–41. In this respect, bracket 43 includes an annular portion 44 which is internally threaded at 45 for mating engagement with threads 40–41. Thus, portion 44 aids in maintaining cap 26 in assembled relationship with shoulder end portion 27. An annular bracket portion 46 extends perpendicularly to annular bracket portion 44 and it has a plurality of bores 47 therein which receive bolts 49 having heads 50. Shanks 51 of bolts 49 extend through bores 47 and bores 52 in annular bracket 53 which has a frustoconical surface 54 which bears on frustonical surface 55 of cap 26. Bolts 49 are received in external members 56 for mounting the pressure accumulator 10 to an external object. A pressure conduit 57 has an end 59 which is mounted on cap 26 for conducting high pressure fluid through cap conduit 60 into cylinder 11 to piston head 16.

A helical tension spring 62 encircles cylinder 11 and is spaced from the outer surface 63 thereof. The bottom end (FIG. 1) of helical spring 62 is threaded onto external helical threads 64 of bracket 43 to thereby attach the bottom end of spring 62 to the bottom end of cylinder 11. The top end of spring 62 merges into a frustoconical configuration at 65 to eventually merge into a reduced end portion at 66 which encircles reduced collar portion 23 with portion 67 of the helical spring bearing against shoulder 24. Thus when high pressure fluid is conducted into cylinder 11 through conduit 60 to move piston head 16 and piston rod 13 up in FIG. 1, such movement will be against the tension of spring 62 considering that one end thereof is anchored proximate cap 26 and the other end thereof is anchored on collar portion 23 which is rigidly affixed to the external portion of piston rod 13.

It can thus be seen that the entire pressure accumulator 10 can be made shorter and smaller with an external tension spring, than a pressure accumulator in which the spring is a compression spring located within the cylinder. Furthermore, the method of anchoring spring 62, as described above, provides forces during the extension of piston rod 13, which aid in maintaining cap 26 in mounted position. In this respect, the spring force will tend to bias cap 26 up in FIG. 1 to counteract the fluid pressure which is applied to the annular face 69 of the cap plug 29 by the high pressure fluid. Thus, the use of other retaining means for holding cap 26 in cylinder 11 is obviated because the tension of coil spring 62 counterbalances the hydraulic pressure. However, where vibrational forces are a factor, other retaining means may be required. In addition, since the spring 62 encircles cylinder 11, a larger spring can be used than one which is installed within cylinder 11. Furthermore, since the portion of spring 62 to the right of the bracket portion 44 tends to be spaced from the outer surface 63 of the cylinder, this relationship will tend to avoid rubbing friction therebetween. The pressure accumulator 10 is highly energy efficient because of the ratio of the diameter of spring 62 to the surface area of the piston head 16 provides a relatively great energy storage capacity.

Piston rod 13 has a bore 70 therein which is in communication with chamber 71 through the end 72 of the bore. A conduit 73 is in communication with bore 70. Therefore, if desired, pressurized compressible fluid may be supplied to chamber 71 through bore 70, and if conduit 73 is sealed, whenever piston 16 is moved upward, the compressible fluid in chamber 71 will be compressed to augment the capacity of the pressure accumulator because it will add the energy obtainable from the compressed fluid in chamber 71 to the energy obtainable from the stretched spring 62. The trapping of compressible fluid in chamber 71 is possible because of the existence of seal 12 about piston rod 13 and because of the existence of O-ring 17 in piston head 16, both of which prevent leakage. In addition, if desired, an incompressible fluid, such as hydraulic fluid or grease from a grease gun, may be pumped into chamber 71 to provide extremely high pressures for pressurizing the fluid in the accumulator between piston 16 and cap 29 in emergency situations.

Figure 4:
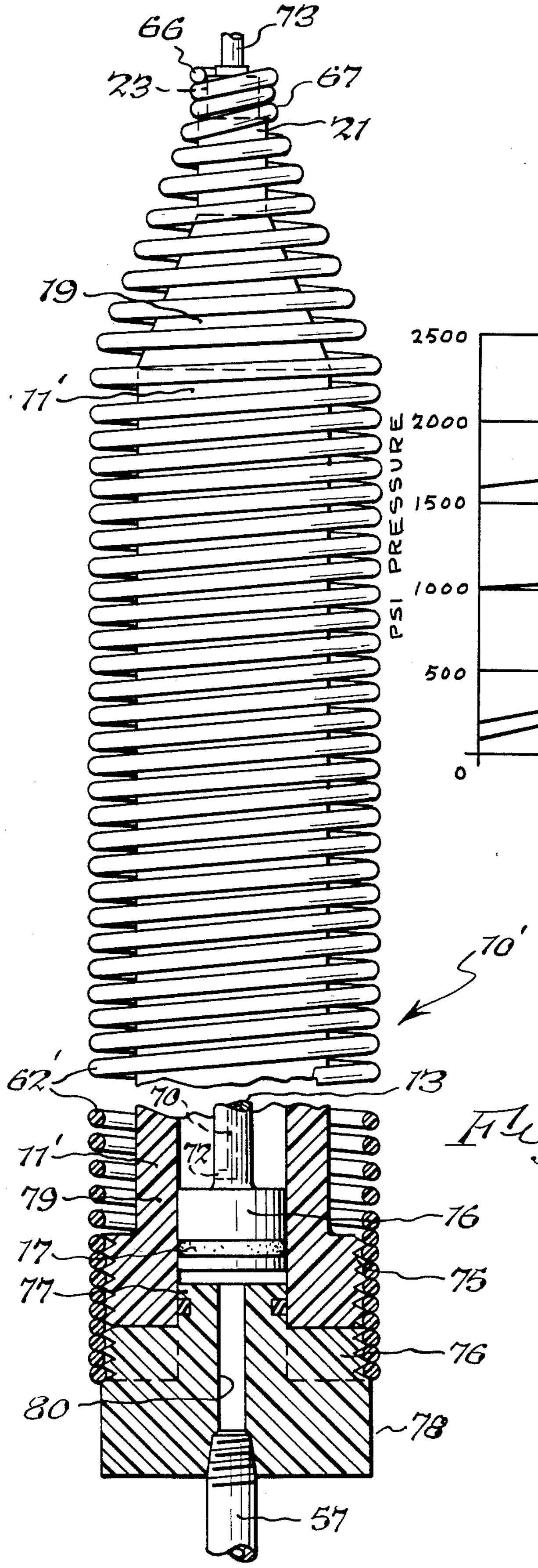
FIG. 4 is a fragmentary cross sectional view of an alternate construction for mounting the cap on the cylinder.

In FIG. 4 an alternate embodiment of the present invention is shown. In this embodiment everything above piston head 16 may be identical to FIG. 1. However, in the pressure accumulator 10' of FIG. 4, the spring 62' is mounted directly on helical theads 75 of cylinder 11' and the threads on the keys 76 of cap 78 rather than on a bracket, such as 43 of FIG. 1. Cap 78 includes a cylindrical plug 77 which fits into the cylindrical end portion 79 of cylinder 11'. A conduit, such as 57 of FIG. 1, is in communication with conduit 80 in cap 76 to conduct high pressure fluid into the cylinder. The fact that the threads 75 are on an outer diameter which is larger than the outer diameter of cylinder 11' causes spring 62' to be spaced from the outer surface of cylinder 11'. Furthermore, the spring tension on cap 78 maintains it in its assembled position.

In accordance with another aspect of the present invention, spring 62 of FIG. 1 is fabricated from a composite which consists of a high strength fiber or metal and plastic resin composition. The plastic resin may be epoxy or any other thermosetting of thermoplastic material, and the fiber may be nylon or aramid or fiberglass or carbon fibers or metal or any other suitable fibers which, in combination with the resin, will provide a composite material having a much higher strength than plastic and a relatively low modulus of elasticity as compared to metal and more particularly to steel. More specifically, the modulus of elasticity of plastic materials is in the area of about 300,000 whereas the modulus of elasticity of steel is about 30,000,000. Therefore, plastics will have approximately one hundred times more deflection than steel. However, plastic is much weaker than steel, and it is for this reason that high strength fibers are combined with the plastic resins. The resulting composite will thus have the combination of high strength plus great elasticity. Thus, the composite coil spring may have up to ten times the energy storage capability of a steel spring because a composite may have ten times the stretchability of steel with the same strength as steel.

Figure 5:
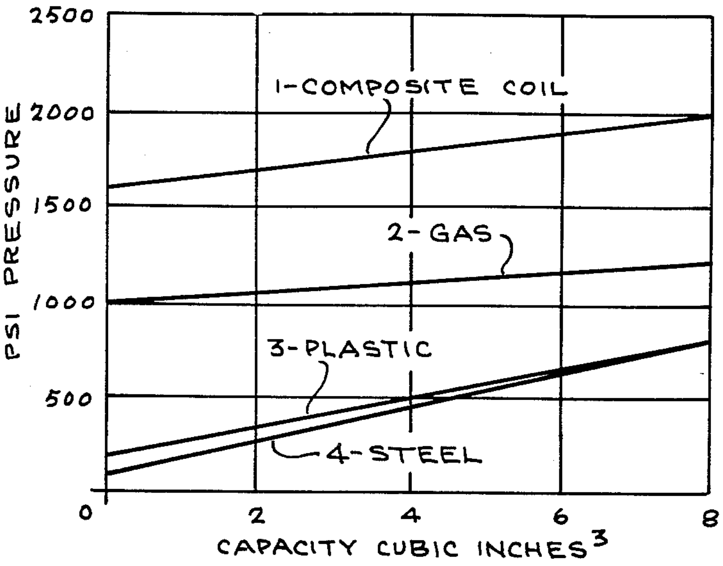
FIG. 5 is a graph depicting the stored energy capability of a pressure accumulator utilizing a composite spring as compared to a gas accumulator or to a pressure accumulator utilizing a plastic spring or a steel spring.

In FIG. 5 there is a comparison of various types of energy storage capacities of pressure accumulators utilizing different types of springs. The pressure in the accumulator is plotted as an ordinate against capacity of the accumulator in cubic inches as an abscissa. If the accumulator has a capacity of eight cubic inches and the piston has an area of one square inch, the piston will have a travel of eight inches, which, in turn, will result in eight inches of stretch of the accumulator spring. At the zero point on the abscissa, the preload is shown for various types of accumulators, such as those using a steel spring on the outside (graph 4), a plastic spring on the outside (graph 3), a composite coil spring on the outside (graph 1), and a gas accumulator (graph 2). The preload as shown in FIG. 5 for each of the springs and the gas accumulator is at the preload which will permit 8 inches of piston travel to be obtained from the accumulator. Thus, it can be seen that a pressure accumulator with a steel spring can only be preloaded to 100 psi and that it will provide a maximum pressure of about 750 psi. The plastic spring operates in a range of between about 200 and 750 psi. In contrast to the foregoing, a pressure accumulator of the type described above, with a composite spring of the type described above, can be operable between a preload of 1,600 psi and 2,000 psi for an 8 cubic inch capacity. In other words, the composite coil spring can stretch 8 inches between 1,600 psi and 2,000 psi so that it can provide pressure in a higher range than an accumulator having either a plastic or a steel spring. The graph of the gas accumulator is shown in FIG. 5 strictly for comparison purposes inasmuch as it was a preferred form over either the plastic or steel spring accumulators because of its greater capacity, but it can be seen that the composite coil spring pressure accumulator (graph 1) has much more energy storage capacity.

It will be appreciated that springs of various metals, composites or plastic have different wire sizes, diameters or cross sections for optimum performance. The external placement of such springs in the manner of the present invention permits all such variations in spring construction to be used in an extremely convenient manner. In addition, energy systems are commonly built for 500, 1,000, 3,000 and 9,000 psi service. A common accumulator body having interchangeable external springs of varying capacity provides for rapid delivery with minimum inventory for all the pressure systems indicated above.

Thus, in addition to the present invention disclosing a pressure accumulator with a plastic body and an unique end cap construction and an unique spring construction associated with the plastic body and the end cap, it also discloses an unique combination of a pressure accumulator utilizing a composite spring which has a much greater energy storage capacity than prior accumulators utilizing steel or plastic springs.

While the foregoing description has referred to cylinder 10 as being plastic, it is to be understood that it may be fabricated of metal and can utilize a separate seal which resembles the seal shown in U.S. Pat. No. 4,265,344, and further, if desired the external spring may be made of metal. A pressure accumulator with a metal cylinder and metal spring may be used where plastic would be unsuitable because of the deleterious effect of temperature, radiation or ultraviolet rays.

It can thus be seen that the improved pressure accumulator of the present invention is manifestly capable of achieving the above-enumerated objects, and while preferred embodiments of the present invention have been disclosed, it will be appreciated that it is not limited thereto but may be otherwise embodied within the scope of the following claims.

What is claimed is:

1. A pressure accumulator comprising a cylinder having first and second cylinder ends, a piston in said cylinder, a bore in said first cylinder end, a piston rod attached to said piston and extending through said bore, a fluid inlet at said second cylinder end for conducting fluid into said cylinder, an external portion on said piston rod located outside of said cylinder, a helical spring encircling said cylinder, first and second spring ends on said helical spring, first attachment means fixedly coupling said first spring end to said external portion of said piston rod, and second attachment means coupling said second spring end to said cylinder remote from said first end.

2. A pressure accumulator as set forth in claim 1 including a cap for closing said second cylinder end.

3. A pressure accumulator as set forth in claim 2 wherein said fluid inlet extends through said cap.

4. A pressure accumulator as set forth in claim 2 wherein said second attachment means comprise ridges on said cap for receiving said second spring end.

5. A pressure accumulator as set forth in claim 2 including bracket means for attaching said cylinder to an external object, and securing means securing said bracket means to said cap.

6. A pressure accumulator as set forth in claim 5 wherein said securing means comprise a threaded connection between said bracket and said cap.

7. A pressure accumulator as set forth in claim 6 wherein said cap includes a plug portion which fits into said cylinder, and wherein said cylinder includes a cylinder shoulder at said second cylinder end, and wherein said cap includes a cap shoulder in abutting relationship with said cylinder shoulder.

8. A pressure accumulator as set forth in claim 7 including seal means between said plug portion and said cylinder.

9. A pressure accumulator as set forth in claim 6 including a second threaded connection between said second cylinder end and said bracket.

10. A pressure accumulator as set forth in claim 9 wherein said second attachment means comprises ridges on said bracket for receiving said second spring end.

11. A pressure accumulator as set forth in claim 10 wherein said ridges comprise a helical thread for receiving said second spring end of said helical spring.

12. A pressure accumulator as set forth in claim 4 wherein said ridges comprise a helical thread for receiving said second spring end of said helical spring.

13. A pressure accumulator as set forth in claim 2 wherein said cap includes a plug portion which fits into said cylinder, and wherein said cylinder includes a cylinder shoulder at said second cylinder end, and wherein said cap includes a cap shoulder in abutting relationship with said cylinder shoulder.

14. A pressure accumulator as set forth in claim 13 including key attachment means for providing a non-rotational fit between said cylinder and said cap.

15. A pressure accumulator as set forth in claim 14 wherein said key means comprise at least one protuberance on said cap and at least one recess at said second cylinder end for receiving said at least one protuberance.

16. A pressure accumulator as set forth in claim 15 wherein said second attachment means includes a helical thread on said second cylinder end, helical thread portions on said at least one protuberance in alignment with portions of said helical thread, and wherein said second spring end is mounted on said helical thread and on said helical thread portions and thus provides shear connections between adjacent portions of said helical thread and said helical thread portions.

17. A pressure accumulator as set forth in claim 1 wherein said cylinder is fabricated from plastic.

18. A pressure accumulator as set forth in claim 17 including seal means formed integrally with said cylinder at said first cylinder end for receiving said piston rod.

19. A pressure accumulator as set forth in claim 18 including a cap for closing said second cylinder end.

20. A pressure accumulator as set forth in claim 19 wherein said cap includes a plug portion which fits into said cylinder, and wherein said cylinder includes a cylinder shoulder at said second cylinder end, and wherein said cap includes a cap shoulder in abutting relationship with said cylinder shoulder.

21. A pressure accumulator as set forth in claim 20 wherein said fluid inlet extends through said cap.

22. A pressure accumulator as set forth in claim 18 including bore means in said piston rod for effecting communication between said cylinder and said external portion of said piston rod.

23. A pressure accumulator as set forth in claim 1 wherein said helical spring is fabricated from material having a higher strength than a plastic resin and a lower modulus of elasticity than steel.

24. A pressure accumulator as set forth in claim 23 wherein said material is a composite of a plastic resin and high strength fibers.

25. A pressure accumulator comprising a cylinder having first and second cylinder ends, a piston in said cylinder, a bore in said first cylinder end, a piston rod attached to said piston and extending through said bore, a fluid inlet at said second cylinder end, an external portion on said piston rod located outside of said cylinder, a composite spring of plastic resin and high strength fibers having first and second spring ends, first attachment means attaching said first spring end relative to said cylinder, and second attachment means attaching said second spring end to said external portion of said piston rod, said composite spring having a lower modulus of elasticity than steel and a higher strength than plastic resin.

26. A pressure accumulator as set forth in claim 1 wherein said fluid inlet conducts fluid into said cylinder on the opposite side of said piston from said piston rod, and a second fluid inlet on the opposite side of said piston from said fluid inlet for conducting fluid into said cylinder.

27. A pressure accumulator as set forth in claim 26 wherein said second fluid inlet comprises a second bore in said piston rod.

* * * * *